Inventor
Sidney T. Carter
by Roberts Cushman & Grover
att'ys.

Nov. 27, 1956  S. T. CARTER  2,771,725
METHOD OF AND APPARATUS FOR USE IN APPLYING
CONTRACTIBLE BANDS TO ARTICLES
Filed March 16, 1954  5 Sheets-Sheet 2

Inventor
Sidney T. Carter
by Roberts Cushman & Grant
Att'ys.

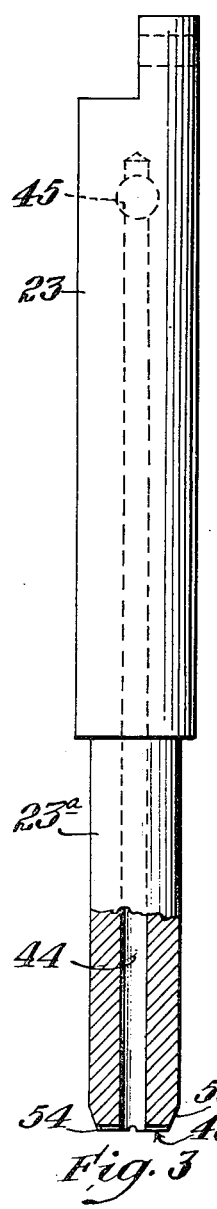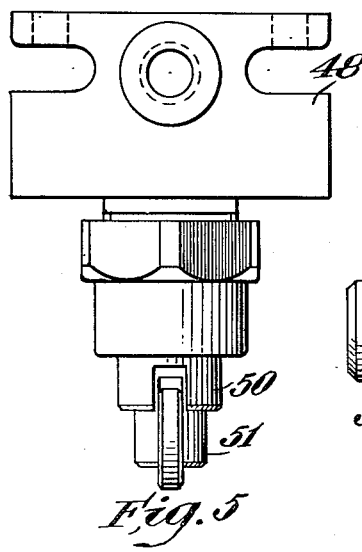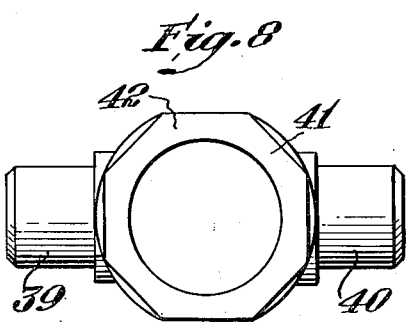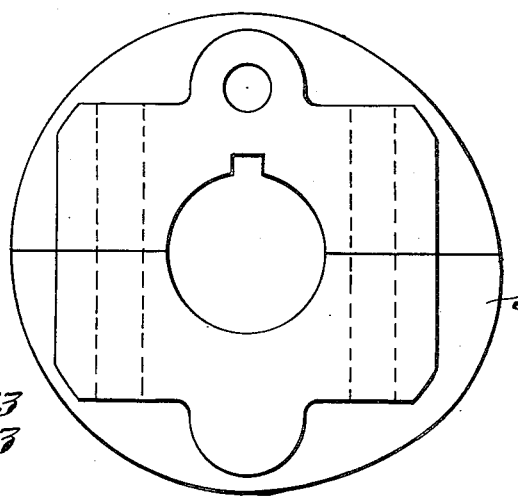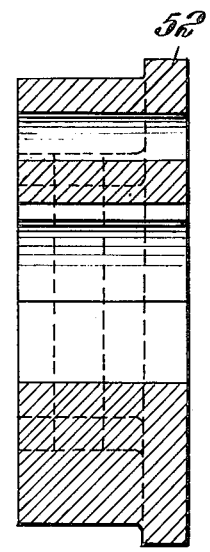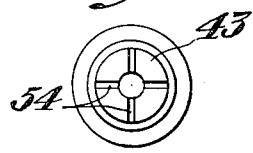

Nov. 27, 1956  S. T. CARTER  2,771,725
METHOD OF AND APPARATUS FOR USE IN APPLYING
CONTRACTIBLE BANDS TO ARTICLES
Filed March 16, 1954  5 Sheets-Sheet 4
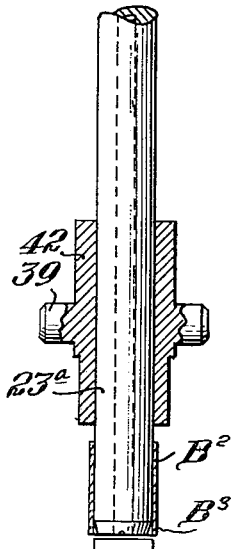
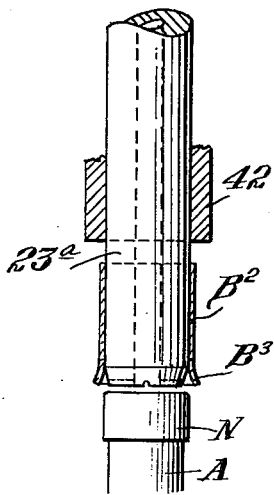
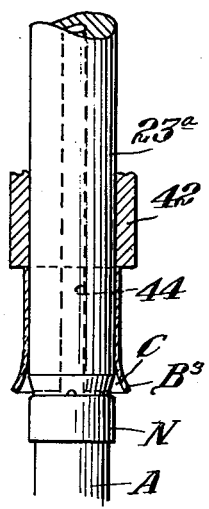
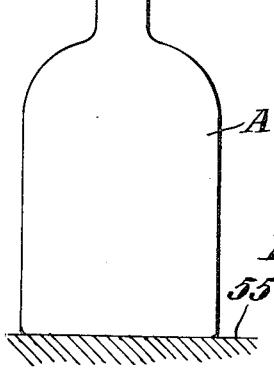
Fig.9
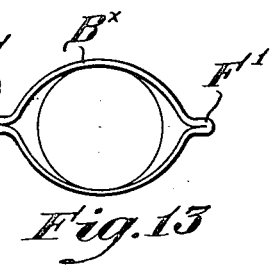
Fig.13
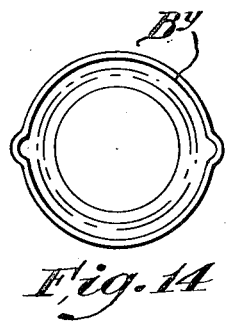
Fig.14
Inventor
Sidney T. Carter
by Roberts Cushman & Crowe
att'ys.

Inventor
Sidney T. Carter
by Roberts Cushman Crown
Att'ys.

United States Patent Office 2,771,725
Patented Nov. 27, 1956

2,771,725

METHOD OF AND APPARATUS FOR USE IN APPLYING CONTRACTIBLE BANDS TO ARTICLES

Sidney T. Carter, Shrewsbury, Mass., assignor to Geo. J. Meyer Manufacturing Co., Cudahy, Wis., a corporation of Wisconsin Application March 16, 1954, Serial No. 416,561

25 Claims. (Cl. 53—41)

This invention pertains to machines for applying contractible bands to articles, for example containers, and, as here particularly described, to the neck portions of bottles. Such bands are customarily of regenerated cellulose and are applied when wet and, in drying, shrink so as tightly to embrace the part to which they have been applied. The present invention relates more especially to a method of and improved means for slipping the wet band over the neck portion of a bottle.

In at least one commercial type of banding machine the banding material is initially provided in the form of a flattened tube from which short lengths are cut and opened out to approximately circular form. While held in this condition, a cylindrical plunger is entered into the band. The end of the plunger is then contacted with the top of the container (for example the bottle cap) while the container is arranged in as nearly coaxial relation to the plunger as is practicable, and then a stripper sleeve engages the upper edge of the band and forces the band to slide downwardly along the plunger and onto the container. This method of procedure is in general satisfactory, providing the container is accurately coaxial with the sleeve while the sleeve is being moved by the stripper, but if the parts are not accurately coaxial the advancing edge of the band may contact the container top which causes the band to buckle and fail to slip over the container. Even though eccentricity of the parts may not occur frequently or may be corrected, difficulty is sometimes experienced, as the result for example of atmospheric conditions; some particular characteristic of the banding material; or surface characteristics of the container such that the band does not slip freely from the plunger onto the container, sometimes tending to stick to the plunger and sometimes tending to stick to the container, so that the band is wrinkled or even ruptured by the action of the stripper. Moreover, as the band material is initially a flattened tube, the individual band tends to have diametrically opposed outwardly projecting bends or crimps at the location of the fold lines in the original tubular material, and these bends or crimps sometimes persist as the band is slipped onto the container with the result that the band does not shrink so as smoothly and tightly to embrace the container.

The present invention has for objects, the provision of a novel method of applying bands to containers such that slight eccentricity of the band and container will not interfere with the slipping of the band over the container. A further object is to provide a novel method of applying bands to containers such that the advancing end of the band is temporarily expanded in diameter as it approaches the container. A further object is to provide a novel method of applying bands to containers wherein a lubricating medium is interposed between the inner surface of the band and the container as the band is being slipped over the container. A further object is to provide a novel method of applying bands to containers wherein a film of compressed air is introduced between the band and the container while the band is being slipped over the container thereby eliminating tendency of the band to stick to the container until it has been placed in final position. A further object is to provide a novel method of applying bands to containers wherein a film of air is interposed between the plunger and the band during the slipping of the band onto the container whereby to prevent the band from sticking to the plunger. A further object is to provide a novel method of applying bands to containers wherein compressed air is admitted to the interior of the band as it is being slipped over the container thereby exerting equal and outward radial pressure against the band thus tending to conform the band to accurate circular contour as it is slipped down over the container. A further object is to provide novel and improved apparatus constituting one embodiment of means for applying bands to containers. Other and further objects and advantages of the invention will be pointed out in the following more detailed description and by reference to the accompanying drawings, wherein Fig. 1 is a fragmentary plan view showing a portion only of a band-applying machine of a type to which the present invention is applicable, but indicating the band-applying plunger, the shaft on which is mounted the cam which actuates the plunger, and also illustrating one embodiment of means, in accordance with the present invention, whereby compressed air is delivered at the proper times in the cycle of operation for expanding the band as it is being slipped onto the container;

Fig. 3 is a side elevation of the band-positioning plunger, to larger scale, showing the lower part of the plunger in diametrical section;

Fig. 4 is a bottom view of the plunger shown in Fig. 3;

Fig. 5 is a plan view of a desirable form of air control valve;

Fig. 6 is a side elevation of the cam for controlling the admission of air;

Fig. 7 is a diametrical section through the cam shown in Fig. 6;

Fig. 8 is a plan view of the stripper sleeve which removes the band from the plunger;

Fig. 9 is a fragmentary elevation, showing the band and the stripper in diametrical section, the plunger being in coaxial relation to a bottle to which the band is to be applied, the parts being in the position which they occupy just before the band is slipped onto the container;

Figs. 10, 11 and 12 are diagrammatic, fragmentary diametrical sections through the band and stripper showing the effect on the band of the admission of compressed air during the slipping of the band onto the container;

Fig. 13 is a diagrammatic transverse section through a band made from a strip of folded tubular material showing the diametrically opposed bends or crimps usually found in the open band at the locations of the fold lines;

Fig. 14 is a view similar to Fig. 13, but showing how, in accordance with the present invention, these bends or crimps are substantially eliminated by the action of the compressed air;

Figure 24:
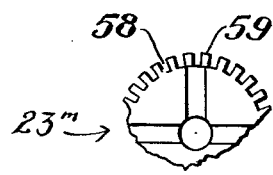
Figure 23:
Figure 15:
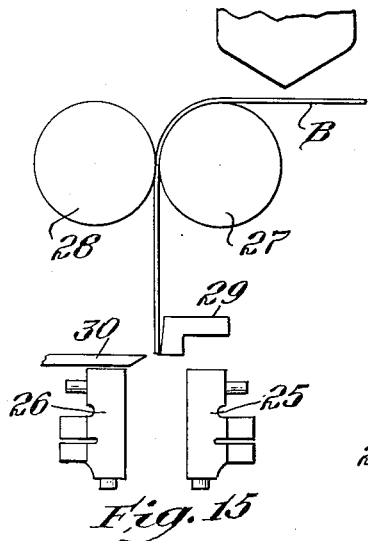
Figure 16:
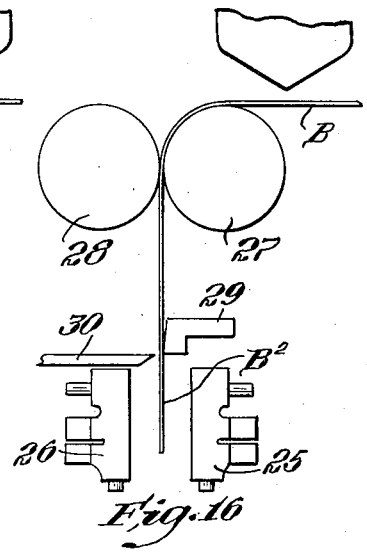
Figure 17:
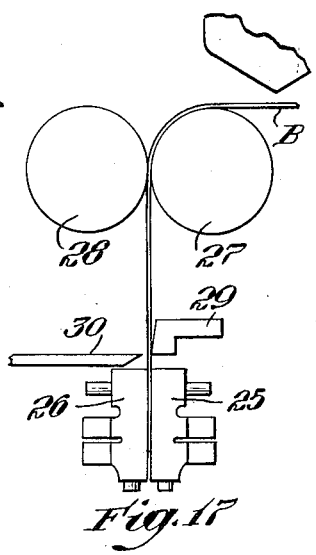
Figure 18:
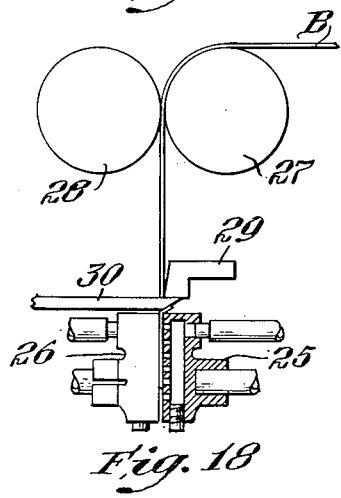

Figs. 15 to 22 inclusive, are diagrammatic elevations, illustrative of the sequence of operations involved in the formation and application of a band to a bottle neck as performed by a machine embodying the present invention;

Fig. 23 is a fragmentary diametrical section, illustrating a plunger of modified form; and Fig. 24 is a fragmentary bottom view of the plunger of Fig. 23.

Figure 1:
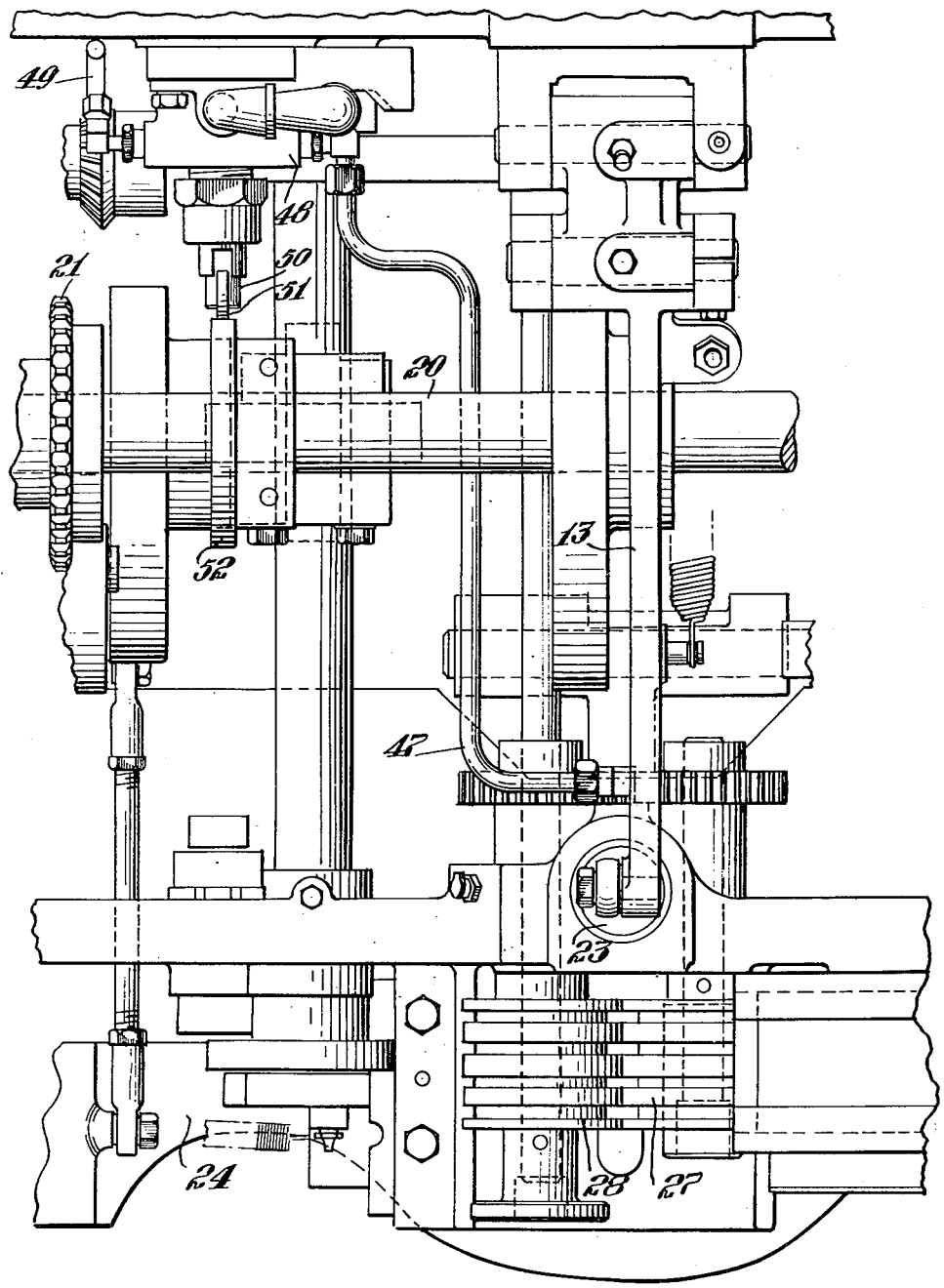
Figure 2:
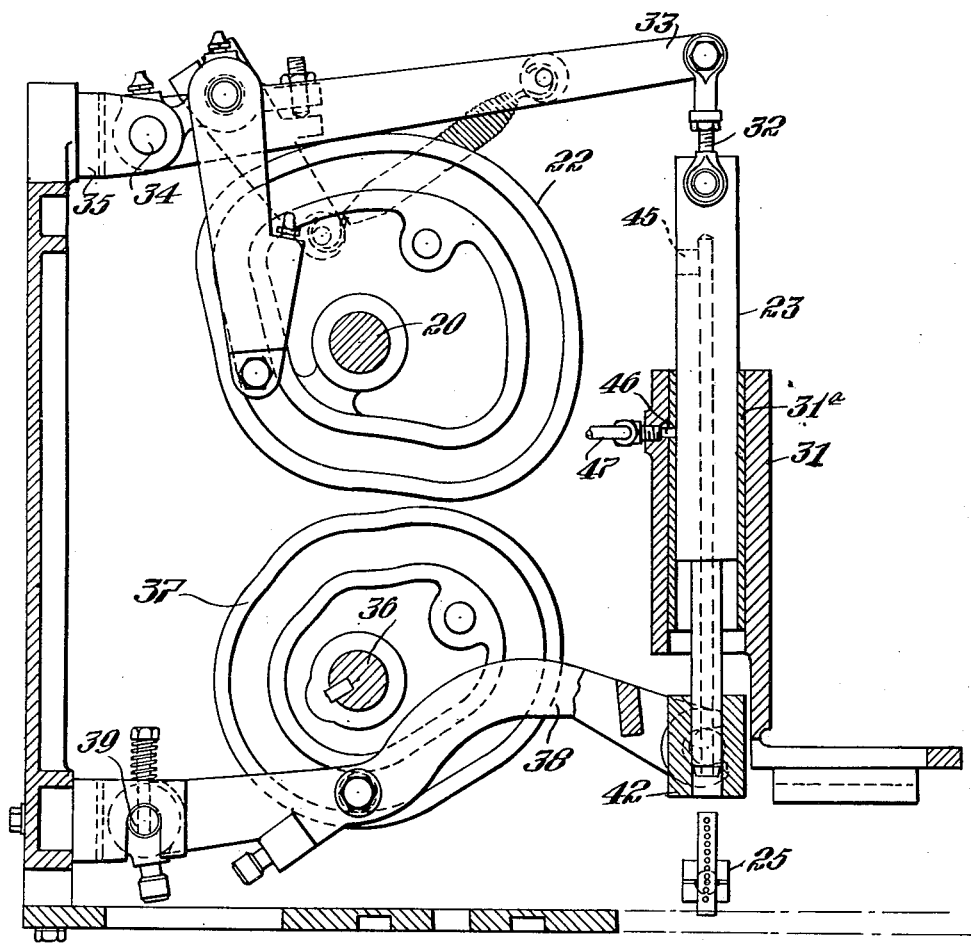
Fig. 2 is a fragmentary vertical section in the plane of the axis of the plunger which applies the band to the container, said plane being perpendicular to the axis of the shaft on which the plunger actuating cam is mounted.
Figure 19:
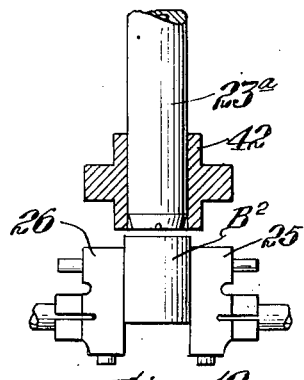

Referring to the drawings and particularly to Fig. 1 which is a fragmentary plan view showing parts of a commercial type of banding machine of the general kind disclosed by way of example in the copending application of Bartlett et al., Serial No. 256,016, filed November 13, 1951, but modified to embody the present invention, the numeral 20 designates a horizontal, transversely extending cam shaft provided with a sprocket 21 which receives a chain, not shown, which is constantly driven by suitable motor means to turn once for each cycle of operation of the machine. One of the cams mounted on the shaft 20 is the cam 22 (Fig. 2) which actuates the vertically reciprocable band-positioning plunger 23 (Figs. 1 and 2), while another cam on the same shaft actuates the horizontally sliding carriage 24 (Fig. 1) on which are mounted the suction cups 25 and 26 (Figs. 15 to 20 inclusive), these suction cups being arranged to receive between them a depending vertical length of band-forming material B (Fig. 15) which is a flattened tube, usually of wet regenerated cellulose or the like, and which is advanced at the proper intervals by the feed rolls 27 and 28. The depending length of the flattened tubular banding material passes down between the stationary cutter 29 and the movable cutter 30, thereby forming a length $B^2$ (Fig. 16) of the banding material below the cutters sufficient to form a single band. This length $B^2$ is interposed between the suction cups 25 and 26 which are at this time separated, but which now advance to grip the band material between them. As the cutters operate to cut off this length of banding material, suction is established at the suction cups so that the latter grip the opposed flat surfaces of the banding material. The suction cups then move apart while the carriage 24 is moved until the suction cups are at the diametrically opposite sides of the axis of the plunger 23, the suction cups separating during this movement so that, as illustrated in Fig. 19, the neck-forming length $B^2$ of banding material is partially opened and is located directly below and coaxial with the end of the plunger 23.

The plunger 23 (Fig. 2) moves up and down in a bearing 31 supported by the machine frame, this bearing preferably having an anti-friction lining sleeve 31a in which the plunger slides, the plunger being actuated by a pitman 32 connected at its upper end to the forward end of a lever 33 which swings up and down about the axis of a shaft 34 journaled in a bracket 35 carried by the machine frame. The lever 33 is moved up and down in response to the rotation of the cam 22 on the shaft 20 above described.

A second horizontal shaft 36 (Fig. 2), extending transversely of the machine, is located below the shaft 20 and is constantly driven by suitable connections from the drive motor, and this shaft carries a cam 37 which actuates a lever 38 pivoted to swing about the axis of a shaft 39 supported by the machine frame, the free end portion of the lever 38 being bifurcated. The arms thus provided at the free end of the lever are forked to receive pintles 39 and 40 (Fig. 8) projecting from the opposite sides of a stripper sleeve 42 which is arranged to slide up and down on the lower part 23a (Fig. 3) of the plunger 23.

The lower end 43 of the plunger (Fig. 3) is substantially flat and is designed to contact the upper surface of the container while the band is being transferred to the latter from the plunger. As here illustrated, the lower portion 23a of the plunger is of somewhat less diameter than the portion which slides in the bearing 31, the lower part of the plunger desirably being of a diameter closely approximating, although preferably somewhat greater than the diameter of that part of the container, for example, the upper end of the bottle neck over which the band is to be slipped from the plunger. In accordance with the present invention, the plunger is provided with an axial, longitudinal bore 44 which extends from the lower end 43 of the plunger nearly up to the upper end of the plunger where it intersects a transverse bore 45 leading to the exterior surface of the plunger. The bearing 31 is provided, near its upper end, with a radial port 46 (Fig. 2), desirably internally screw-threaded, which receives a pipe fitting to which one end of an air pipe 47 is secured. This air pipe 47 (Fig. 1) leads to a control valve 48 which may be of any suitable type, for example as illustrated in Fig. 5, comprising a reciprocating stem 50 provided with an anti-friction roll 51 which engages a cam 52 (Figs. 1, 6 and 7) which is fixed to the shaft 20 so that it makes one revolution for each cycle of operation of the machine.

As illustrated in Fig. 3, the lower end of the plunger is tapered at 53 so that the bottom surface 43 of the plunger is of somewhat smaller diameter than the part 23a of the plunger. For a purpose hereafter described, it is preferred to provide the lower surface 43 of the plunger with one or more grooves or channels 54 leading from the bore 44 to the beveled or tapered surface 53 of the plunger.

As illustrated in Figs. 23 and 24, the plunger 23m is generally similar to the plunger 23 above described, except that it is provided at its lower portion with longitudinally extending flutes or grooves 58 separating spaced peripheral surfaces 59. Preferably the widths of the grooves 58 are such that the collective area of the surfaces 59 represents approximately one-half the peripheral surface of the ungrooved plunger. This arrangement so lessens the surface of contact between the plunger and band as greatly to reduce friction, thus further facilitating the slipping of the band from the plunger. However, the presence of the grooves or channels 58 does not materially lessen the effect of the compressed air which is delivered as a sudden blast and which is diffused so slowly in passing through the channels 55 that its lubricating action is still effective.

The machine is provided with any appropriate means, for example a conveyor 55 (Fig. 2) for bringing the article which is to be banded into the band-receiving position and for temporarily holding it stationary in this position while the band is being applied.

As illustrated in Fig. 13, the band Bx, as it is opened by the action of the suction cups, customarily shows bends or crimps at F and F' at diametrically opposite points, these crimps being at the locations of the fold lines in the flattened tubular banding material, the material taking a more or less permanent set at these fold lines so that it resists opening out to a true circular curvature at the points F and F'.

Figure 20:
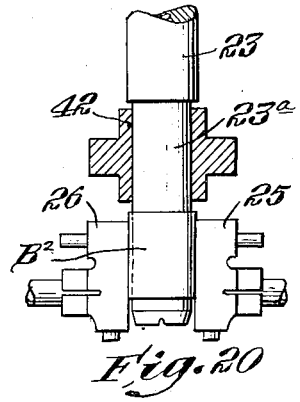
Figure 21:
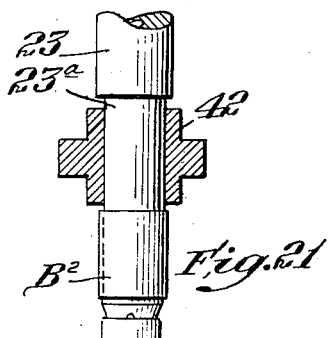
Figure 22:
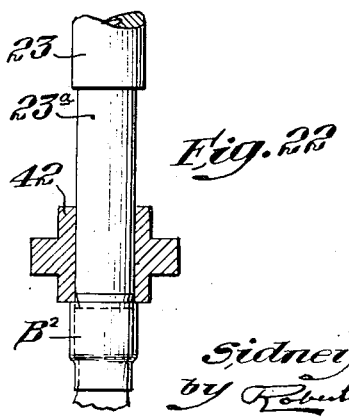

The operation of the machine as hereinabove described, and in addition to the operations which are customary in a machine of this general type, are substantially as follows, it being assumed that as illustrated in Fig. 20 the plunger has moved down into the partially opened band $B^2$ held by the suction cups 25 and 26 so that the band is further expanded toward a true circular curvature by the introduction of the rigid cylindrical plunger into the band. The suction at the cups 25 and 26 is now broken and the cups return to their initial band-receiving position, thus leaving the band on the lower part 23a of the plunger, as illustrated in Figs. 9 and 21. It will be noted (Fig. 9) that the parts are so timed that when the plunger enters the band $B^2$, the lower marginal portion of the band overlaps the tapering lower end portion of the plunger, the lower edge of the band being substantially flush with the lower face 43 of the plunger.

The plunger now moves down until the end face 43 of the plunger contacts the top of the container, for example, a cap on the neck N of the bottle A. During this last-named downward movement of the plunger the cam 52 actuates the stem 50 of the air control valve 48 so as to admit compressed air from a suitable source of supply to the transverse port 46 (Fig. 2) in the bearing 31, the parts being so timed that the valve is opened just as the transverse passage 45 of the plunger registers with the port 46. Compressed air thus flows down through the bore 44 of the plunger and is delivered from the lower end of the plunger, but since the lower end of the plunger is very close to the upper surface of the bottle cap, this air is deflected laterally. The first effect is indicated in Fig. 10, wherein, before the lower surface of the plunger has actually contacted the cap, the air flowing out laterally flares the lower margin $B^3$ of the band, so that this lower margin becomes of substantially greater diameter than that of the bottle cap. Thus, if there be a slight eccentricity of the bottle with respect to the axis of the plunger, the enlargement of the lower edge of he band is sufficient to permit the lower edge of the band to pass down over the upper edge of the bottle cap without interference and without tendency of the band to buckle or wrinkle.

Just as the lower surface 43 of the plunger contacts the upper surface of the bottle cap (Fig. 11), at which time the downward movement of the plunger ceases, the stripper sleeve 42, which has already begun its downward movement by the action of the cam 47, engages the upper edge of the band $B^2$ and begins to slide the latter down along the plunger. During this movement, air passes from the bore 44 of the plunger outwardly through the grooves 54 in the lower end of the plunger and this continuing outward flow of air further expands the lower portion of the band, the air being more or less confined in the annular chamber defined by the band, the tapering lower surface of the plunger, and the upper surface of the bottle cap. The result of this confinement of this compressed air is to tend to cause the air to flow up between the inner surface of the band $B^2$ and the peripheral surface of the plunger (Fig. 12) and eventually to expand the band throughout its length, thus forming a film or layer of air between the band and the plunger and also between the lower part of the band and the outer surface of the bottle neck. Thus, in effect, the band floats on a lubricating layer of air so that it very easily slips down over the bottle neck and from off of the plunger in response to the further downward movement of the stripper sleeve 42.

As a result of the inflation of the band by the compressed air as above described, the band, as shown at $B_y$ in Fig. 14, is constrained to assume a very nearly circular form, the bends or fold lines F and F' as shown in Fig. 13 substantially disappearing, or at least being so reduced that during the subsequent shrinkage of the band they completely disappear. As soon as the stripper sleeve has completed its motion, the cam 52 allows the air valve to close, thus cutting off air from the supply. The stripper sleeve and plunger now immediately rise, leaving the band properly positioned on the bottle neck and the bottle is again advanced by the conveyor to give room for the next bottle of the series.

While one desirable apparatus for carrying out the novel method of the present invention has herein been described and illustrated by way of example, it is to be understood that the invention is broadly inclusive of any and all modifications which may fall within the scope of the appended claims.

I claim:

1. In combination, in a band-applying machine wherein a pre-cut contractible band of predetermined length to be placed on a circular part is held in applying position while mounted on a cylindrical plunger of a diameter closely approximating that of the part to be banded, stripping means movable longitudinally of the plunger for slipping the band downwardly from off of the plunger and onto the part to be banded and fluid pressure means for increasing the diameter of the lower margin of the band while the band is moving in an axial direction from off the plunger and onto the part to be banded.

2. In combination, in a band-applying machine wherein a contractible band to be placed on a circular part is held in applying position while mounted on a cylindrical support of a diameter closely approximating that of the part to be banded, stripping means for sliding the band downwardly from off of the cylindrical support onto the circular part which is to be banded, means providing a supply of compressed air, a valve for controlling the delivery of compressed air from the supply, means for conducting air from the supply to the interior of the band thereby to increase the internal diameter of the band while the band is being moved in an axial direction from off the support and onto the part to be banded, and means operative to actuate the stripping means and the valve in timed relation.

3. In combination, in a band-applying machine comprising a band-positioning plunger, means for temporarily holding a circular part to be banded below and in substantially coaxial relation to the plunger, and means for transferring a band from the plunger to said part, the plunger having therein a passage leading to its lower end, a channel leading from said passage to the periphery of the lower end portion of the plunger, and means operative to supply compressed air to said passage during the transfer of the band to said part.

4. In combination, in a band-applying machine comprising a band-positioning plunger, means for temporarily holding a circular part to be banded below and in substantially coaxial relation to the plunger, means for transferring a band from the plunger to said part, the plunger having therein a passage leading to its lower end, the lower end portion of the plunger tapering in diameter so that the lower margin of a band carried by the plunger is spaced from the plunger thereby providing an annular chamber between the plunger and the lower margin of the band, and means operative to supply compressed air to said passage so as to fill said annular chamber and expand the lower margin of the band as the band is being transferred from the plunger to said part.

5. In combination, in a band-applying machine of the kind which includes an axially movable band-positioning plunger, means for holding a partially open band in position to be entered by the plunger, means operative temporarily to hold an article to be banded in approximately coaxial relation to the plunger, means for stripping a band from the plunger onto an article so held, means for moving the plunger to engage its end with the top of an article so held, means for operating the means for supplying lubricant to the interior of the band while the latter is on the plunger and preparatory to stripping it from the plunger onto the article to be banded, and means for operating the lubricant supplying means in timed relation to the motion of the stripping means.

6. A band-applying means according to claim 5, wherein a conduit delivers lubricant from a supply, valve means for controlling the flow of lubricant through the conduit, the conduit terminating at a point such as to deliver lubricating medium between the plunger and the inner surface of the band preparatory to the operation of the stripping means, and means operative to actuate the valve in timed relation with the operation of the stripping means.

7. A band-applying machine according to claim 5 wherein the lubricating means comprises a source of compressed gaseous fluid, a conduit for delivering said fluid from the end of the plunger, a valve for controlling the flow of fluid through said conduit, and means for opening the valve as the plunger is moving toward the article to be banded.

8. A band-applying machine according to claim 5, wherein the plunger has a longitudinally extending bore and is provided with a groove in its end surface leading outward from said bore, a source of compressed gaseous fluid, means for conducting the fluid from the source to the bore of the plunger, a valve for controlling the delivery of fluid to the axial bore of the plunger, and means operative, as the plunger approaches the article to be banded, to open said valve.

9. In combination, in a band-applying machine of the kind which includes an axially movable band-positioning plunger, means for holding a pre-cut, partially open band of predetermined length in position to be entered by the plunger, means operative temporarily to hold an article to be banded in approximately coaxial relation to the plunger, means comprising a part which moves axially of the plunger for stripping a band from the plunger onto an article so held, means for moving the plunger downwardly to engage its end with the top of an article so held, means for operating the stripping means to slide a band from the plunger onto the article, fluid pressure means for expanding the lower end of a band held by the plunger, and means whereby such expanding means is caused to act as the plunger approaches the article to be banded.

10. In combination, in a band-applying machine of the kind which includes an axially movable band-positioning plunger, means for holding a partially open band in position to be entered by the plunger, means operative temporarily to hold an article to be banded in approximately coaxial relation to the plunger, means for stripping a band from the plunger onto an article so held, means for operating the stripping means to slide a band from the plunger onto the article, the plunger having a longitudinally extending bore terminating at the end face of the plunger, said end face of the plunger being of less diameter than the main body of the plunger, and means for supplying pressure fluid to said bore.

11. A band-applying machine according to claim 10 wherein the end of the plunger tapers in diameter and wherein a channel leads outwardly from the bore to the tapering surface of the plunger whereby, when the end surface of the plunger contacts the article, pressure fluid may flow from the bore in the plunger to expand the lower marginal portion of the band.

12. A band-applying machine, wherein a plunger holds an open band while the latter is moved axially onto an article, stripping means movable lengthwise of the plunger for sliding the band downwardly from off of the plunger and onto the part which is to be banded and means for creating a film of compressed air between the inner surface of the band and the plunger and between the inner surface of the band and the article as the band is moved from the plunger to the article.

13. A band-applying machine, wherein a plunger holds an open band while the latter is moved axially onto an article, stripping means movable lengthwise of the plunger for sliding the band downwardly from off of the plunger and onto the part which is to be banded and means for delivering compressed air into the interior of the band as the latter is being transferred from the plunger onto the article, thereby to expand the band radially.

14. A band-applying machine wherein a plunger holds an open band while the latter is moved axially onto an article, means movable longitudinally of the plunger for stripping the band from the plunger onto the article to be banded, means for applying uniform outward radial fluid pressure to the inner surface of the band as it is being transferred from the plunger to the article thereby to remove fold lines from the band.

15. A band-applying machine wherein a rigid cylindrical plunger holds an open band while the latter is moved axially onto an article, means movable longitudinally of the plunger for stripping the band therefrom onto the article to be banded, that portion of the plunger which enters the band being provided with longitudinally extending grooves, thus reducing the peripheral area of the plunger which contacts the band, and means for supplying pressure fluid to the lower end of the plunger while the stripping means is operating.

16. A band-applying machine according to claim 15, wherein the longitudinally extending grooves are equally spaced apart circumferentially of the plunger and are of such widths that those portions of the peripheral surface of the plunger intervening between the grooves collectively constitute approximately one-half of the peripheral surface of the ungrooved plunger.

17. In combination, in a band-applying machine comprising a band-positioning plunger, an elongate bearing in which the plunger slides, said bearing having a port in its wall, means for temporarily holding a circular part to be banded below and in substantially coaxial relation to the plunger, and means for transferring a band from the plunger to said part, the plunger having a radial bore in its upper part which, at times, registers with the port in the bearing wall and a longitudinal passage leading from said bore to its lower end, the lower end surface of the plunger having therein a channel leading outwardly from the bore through which air may escape from the passage even though the lower face of the plunger contacts the article to be banded, and means for supplying compressed air to the port in the wall of the bearing.

18. In combination, in a machine for applying shrinkable bands to containers, means for temporarily holding the container stationary in band-receiving positions, an axially movable plunger substantially coaxial with a container so held, said plunger having a longitudinally extending bore, a stripper sleeve coaxial with and slidable longitudinally of the plunger, a source of compressed air, a valve for admitting air from said source to the bore in the plunger, a driven shaft having a cam thereon for moving the plunger, a second cam on the shaft for opening said valve, said cams being so arranged and contoured that, as the lower end of the plunger nears the container, the air valve is opened, and means for actuating the stripper to slide the band from off the plunger and onto the container after the plunger has contacted the container.

19. In combination, in a machine for applying shrinkable bands to containers, means for temporarily holding a container stationary in band-receiving position, an axially movable plunger substantially coaxial with a container so held, said plunger having a longitudinally extending bore, a stripper slidable longitudinally of the plunger, a pair of suction devices operative temporarily to hold a partially opened band in position to be entered by the plunger, a source of compressed air, a normally closed valve which, when opened, admits compressed air from the source to enter the bore in the plunger, a cam for advancing the plunger toward the container, a cam for moving the stripper to strip the band from the plunger onto the container, a cam for opening the air valve, and means for turning said cams in properly timed relation whereby, while the band is being transferred from the plunger to the container, compressed air is admitted to the interior of the band.

20. In combination, in a band-applying machine designed for applying a band made from a length of flattened tubing to a circular part to be banded and wherein the fold lines of the flattened tube tend to persist in the band, means for supporting the band in position to be moved axially onto the part to be banded, means for stripping the band from off of the supporting means onto the article to be banded, and means for supplying pressure fluid to the interior of the band thereby substantially to eliminate said fold lines during the application of the band to the part to be banded.

21. That method of transferring a contractible band from a plunger onto a part of approximately the same diameter as the plunger which comprises as a step temporarily increasing the diameter of the advancing marginal portion of the band by the application of internal fluid pressure thereto while axially advancing the band toward the part to be banded.

22. That method of transferring a contractible band from a plunger onto a part of approximately the same diameter as the plunger, which comprises as a step delivering compressed air against the upper surface of the part to be banded as the band is advanced toward said part thereby to increase the diameter of the advancing marginal portion of the band.

23. That method of transferring a contractible band from a plunger onto a part of approximately the same diameter as the plunger, which comprises as a step introducing a film of compressed air between the band and plunger while slipping the band from off the plunger onto the said part.

24. That method of transferring a band from a plunger to a part to be banded which comprises as steps moving the plunger toward and into contact with the part to be banded while applying fluid pressure to the interior surface of the marginal portion of the band, thereby to cause said marginal portion to flare as the plunger approaches the part to be banded.

25. That method of transferring a band from a plunger to a part to be banded which comprises as steps moving the plunger so that its end contacts said part and introducing a film of compressed gaseous fluid between the band and the part to be banded while the band is being stripped from the plunger onto the said part.

References Cited in the file of this patent

UNITED STATES PATENTS

| | | |
|---|---|---|
| 2,103,302 | Strout | Dec. 28, 1937 |
| 2,182,187 | Wagner | Dec. 5, 1939 |
| 2,623,673 | Holstein | Dec. 30, 1952 |